United States Patent [19]

Penberthy et al.

[11] 4,404,129

[45] Sep. 13, 1983

[54] SEQUESTERING OF RADIOACTIVE WASTE

[75] Inventors: H. Larry Penberthy; Dennis J. Hotaling, both of Seattle, Wash.

[73] Assignee: Penberthy Electromelt International, Inc., Seattle, Wash.

[21] Appl. No.: 221,376

[22] Filed: Dec. 30, 1980

[51] Int. Cl.$^{3}$ .......................... C09K 3/00; C09K 11/04

[52] U.S. Cl. ................................ 252/629; 250/506.1; 252/633; 264/0.5

[58] Field of Search ................ 250/506; 252/628, 629, 252/632, 633; 264/0.5

[56] References Cited

U.S. PATENT DOCUMENTS

| | | | |
|---|---|---|---|
| 3,365,578 | 1/1968 | Grover et al. | 250/506 |
| 4,172,807 | 10/1979 | Larker | 252/633 |
| 4,222,889 | 9/1980 | Uerpmann | 252/633 |
| 4,224,177 | 9/1980 | Macedo et al. | 252/629 |
| 4,314,909 | 2/1982 | Beall et al. | 252/629 |

FOREIGN PATENT DOCUMENTS

| | | | |
|---|---|---|---|
| 106907 | 8/1979 | Japan | 252/633 |

*Primary Examiner*—Leland A. Sebastian
*Attorney, Agent, or Firm*—LeBlanc, Nolan, Shur & Nies

[57] ABSTRACT

A method for sequestering radioactive waste materials against dissolution and migration into the biosphere during prolonged storage is disclosed. The method comprises incorporating the waste materials as oxides into a mass of molten glass, and subsequently casting the homogeneous molten mass in an inert chemically durable glass container supported by a mold. The container is then sealed and permitted to cool, thereby forming a solid mass having an outer layer or cladding of non-radioactive glass. The glass used for the container preferably is a leach resistant soda-lime-alumina-silica glass similar to conventional bottle glass, and the coefficient of expansion thereof should be sufficiently close to that of the contents to avoid excessive stress at the interface upon cooling.

9 Claims, 8 Drawing Figures

SEQUESTERING OF RADIOACTIVE WASTE

This invention relates to a method for sequestering radioactive waste elements in a glass-clad glass matrix whereby the resulting waste form may be stored for prolonged periods without the possibility that the radioactive elements will leach or escape into the biosphere.

Disposal of radioactive waste materials has presented a serious problem for many years. Because of the long half-life characteristics of certain of these materials, it is necessary to develop storage procedures which will sequester the materials for as much as 300 years. Both public opinion and official regulations are tending to demand zero release of such radioactivity over the entire specified storage period. For example, the isotopes cesium-137 and strontium-90 have half lives of about 30 years. After about 300 years the activity level will have decayed to about that of the background, but in the meantime these elements must be prevented from entering the biosphere.

Many years ago it was determined that fission products oxides could be incorporated into glass and cast as blocks. In certain tests wherein the blocks were buried in a swamp for 20 years, traces of cesium were found to have escaped and migrated several feet from the blocks, and traces of strontium had migrated about 50 feet. From the public perception standpoint, this leakage projected to a 300 year storage period is not acceptable.

In order to eliminate this escape it was proposed to cast the molten glass containing the radioactive elements into heavy stainless steel containers which were then to be sealed by welding lids thereon. This procedure suffers from a major disadvantage in the expense of stainless steel which contains strategic metals such as nickel and chromium. Furthermore, stainless steel does not survive well in the brine environment expected to be encountered in repositories located in salt mines. Utilizing canisters of titanium metal would overcome corrosion problems in a salt water environment, but obviously titanium containers would involve considerable expense and is also a strategic material.

For example, U.S. Pat. No. 3,365,578 describes fusing a glass composition containing radioactive waste oxide materials in a stainless steel vessel. U.S. Pat. No. 4,139,360 and U.S. Pat. No. 4,009,990 describe methods for incorporating radioactive materials into molten glass, and on sintered glass pieces for transfer to a smelting furnace.

It has also been proposed to sequester radioactive oxides by soaking them into a sponge-like silica structure made by the first step of the well known Vycor process. Generally, the procedure involves drying the radioactive materials while in place in the sponge and raising the temperature of the silica structure to a temperature wherein the silica structure shrinks into a dense mass, thus holding the radioactive materials therein.

A silica sponge with radioactive materials distributed therethrough has disadvantages. The radioactive element oxides are not distributed in the silica matrix on a molecular basis. The remnants of passageways by which the radioactive materials in soluble form entered the sponge structure serve as passageways for water to enter later and to leach away the radioactive elements. Further, when the radioactive elements in the passageways near the surface are leached away, the silica sponge is exposed in depth and hence more subject to dissolving by the water, whereby deeper passageways are then exposed to leaching.

As an improvement, it has been suggested to wash the block briefly after drying to reduce the concentration of radioactive materials in the surface skin of the block before the firing step. This is intended to provide, after firing, a skin of silica surrounding the block which contains a low concentration of radioactive materials to thereby serve as a protective coating for the inner portions of the block. This proposal, however, has the disadvantages of uncertain processing control, and a mismatch of the coefficient of expansion of the block surface versus the block interior. Upon cooling, the lesser contraction of the block surface as compared to the block interior will set up a significant strain at the interface. In larger sizes, the surface layer will spall, thus opening the radioactive elements in the interior to solution by environmental water.

In U.S. Pat. No. 4,172,807, it was proposed to mix the radioactive materials in particles of quartz powder and enclose the mixture in a capsule of Vycor glass (96% silica). The capsule is then subjected to heat and pressure to collapse the capsule and fuse the interior. Theoretically, this process should provide a protective coating free of radioactive material guarding a core which contains radioactive material. This procedure, however, does not provide a truly homogeneous mixture of glass and radioactive materials. If the external capsule skin is penetrated, each pocket of radioactive material when exposed to water will dissolve, and serve as an entry site whereby the water may attack the silica matrix from within.

Further, it is to be noted that silica is not the most resistant material to attack by certain environmental waters, especially alkaline.

We have discovered that radioactive element oxides such as from fission products may be perfectly and reliably sequestered for extended periods of time by melting said oxides with other raw materials or glasses to form a molecularly homogeneous radioactive molten glass mass which is then cast into a container made of inert (nonradioactive) glass and cooled to a solid block. The glass of the container (hereafter also called cladding) is chosen to be of high chemical durability (leach resistant). Even though the block is exposed to environmental water under temperature and pressure conditions which slowly dissolve the cladding glass, the radioactive glass is not exposed to solution until the incorporated radioactive elements have decayed to safe levels.

Thus the current regulatory requirement of zero release of radioactive elements for the radioactive waste package for 1000 years can be met by a suitable choice of cladding glass composition, cladding thickness, and storage temperature, even though in contact with environmental water.

It is an object of this invention to provide a means for sequestering radioactive waste capable of resisting leaching and chemical action over a prolonged period of time whereby the waste may be stored until the radioactivity decays to an activity level that is safe.

Another object of this invention is to provide a means for casting radioactive glass in a container of inert glass whereby physical integrity of the radioactive core glass is preserved during prolonged storage by the inert glass cladding substantially completely surrounding the radioactive core glass.

Yet another object of this invention is to provide a process for sequestering radioactive waste elements which is more reliable in operation and in the effectiveness of the resulting waste medium and which is lower in cost than previously proposed processes.

Another object of this invention is to provide a radioactive waste medium wherein both the radioactive core glass and the inert cladding glass are of excellent homogeneity on a molecular scale, whereby superior leaching resistance is achieved.

Another object of this invention is to allow a wider choice of cladding glass compositions for superior resistance to alkaline environmental water.

Another object of this invention is to provide a radioactive waste medium which will meet the current regulatory requirement for zero release of radioactive elements from the waste medium package for 1000 years.

A further object is to meet the foregoing object without the use of expensive or strategic materials.

Another object of this invention is to provide a process for sequestering radioactive waste which does not require high pressure.

These and other objects will become readily apparent with reference to the drawings and following descriptions wherein.

Prior processes for sequestering radioactive materials such as that disclosed in U.S. Pat. No. 4,172,807, and the published report described above, required treating the radioactive materials at relatively low temperatures to reduce volatilizing of the radioactive metal oxides. In the process of this invention, however, the radioactive materials are melted into a molten glass under a batch blanket in an electric furnace of known design and function. Volatile species have a vapor pressure from the melt, but as the vapor starts to pass upwardly through the batch blanket, the vapor condenses at the appropriate temperature level and the solidified material is carried downwardly into the melt as melting proceeds. As a result the concentration of said species in the outgoing molten glass soon reaches equilibrium with the concentration in the incoming batch. The glass from the glass furnace 10 shown schematically in FIG. 1 exits the throat 12 as a homogeneous mass.

Figure 1:
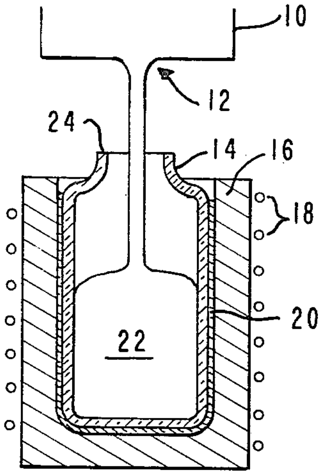
FIG. 1 is a schematic representation in partial cross section illustrating an embodiment of the process of this invention.
Figure 2:
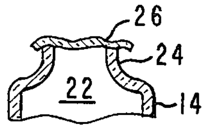
FIG. 2 is a fragmentary cross-section of a container illustrating a method of sealing according to this invention.

In the embodiment of this invention as shown in FIG. 1, a glass container 14 is positioned in a support mold 16. The mold may be a steel drum, graphite or other conventional material. Electric heating elements 18 are provided also. Container 14 is separated from the mold's inner surface by a parting layer 20 preferably of ceramic fiber paper. The flow of molten glass 22 then fills container 14, and is permitted to solidify by loss of heat through the mold walls 16.

The container 14 in its support mold 16 should be preheated to its lower annealing temperature whereby the molten glass 22 will not crack container 14. On the other hand, container 14 should not be heated to the point that the walls of container 14 mix into the molten glass 22 or slump before the container 14 is filled. Some cracking of the glass container during the casting step is acceptable because the cracks heal later at the start of the annealing cycle when the whole mass is at the softening point.

As described above, container 14 and the radioactive molten glass 22 may be any of well known glass compositions so long as the respective coefficients of expansion thereof are relatively matched. The following combination is suitable:

| | Cladding Glass (Commercial Container) | Radioactive Waste Glass |
|---|---|---|
| $SiO_2$ | 71.5 wt % | 61.9 |
| $Al_2O_3$ | 2.6 | 6.0 |
| $Na_2O$ | 14.2 | 13.1 |
| $K_2O$ | — | 2.9 |
| CaO | 10.6 | 11.0 |
| MgO | 0.5 | 1.0 |
| $Fe_2O_3$ | 0.1 | 1.6 |
| $ZrO_2$ | — | 1.0 |
| Fission product oxides | — | 1.0 |
| Other | 0.5 | 0.5 |
| | 100.0 | 100.0 |
| Coeff. of Exp. (0–300° C.) | $87 \times 10^{-7}$ | $86 \times 10^{-7}$ |

To improve the leaching resistance of the cladding glass to alkaline water, part of the silica and soda can be replaced by alumina and calcia. Iron oxide can be added as a flux and for durability improvement. Zirconia can be added for durability improvement. The coefficient of expansion of the radioactive core glass can be adjusted to match the cladding glass by adjusting the soda content, as is well known.

Preferably the neck 24 of container 14 will be sealed. A preferred seal consists of a plate or cup of glass 26 which is fused to the neck 24.

In the alternative, instead of using a plate 26, glass particles may be deposited upon the surface of the radioactive glass 22 in neck 24, and fused in place using conventional heating means.

If the neck 24 of container 14 is sufficiently small, a glass to glass seal may not be necessary. After the casting is cool, a hydraulic-setting ceramic cement such as alumina or glass powder and portland cement, 50/50, may be judged sufficient to meet the non-leaching criteria.

Figure 3A:
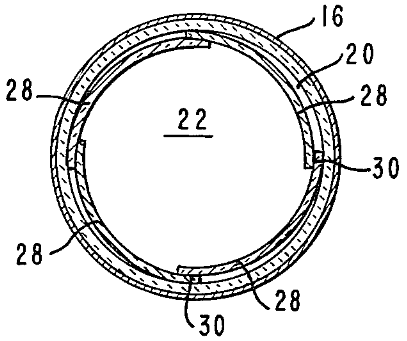
FIG. 3A is a top view and cross section of an embodiment of this invention before the glass cladding is fused.
Figure 3B:
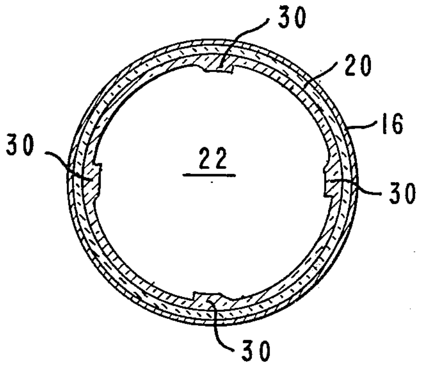
FIG. 3B is a view similar to 3A after the glass cladding has fused.

With attention to FIGS. 3A and 3B, in the alternative to the use of a preformed container 14, the mold 16 may have a parting layer 20 of ceramic fiber paper, and cylindrical segments of plate glass 28 disposed around the inner surface thereof. The base of the mold (not shown in FIGS. 3A and 3B) may be covered with ceramic fiber paper as shown in FIG. 1, and either a disc of glass or a layer of glass particles is disposed thereon to support the cylindrical segments 28.

When a disc is used, a fillet of glass particles may be pre-placed around the rim of the bottom on the inside to fill any inadvertent gaps between the sidewall plates 28 and the bottom disc.

The mold is heated before introducing the molten radioactive waste glass to avoid cracking of the cladding glass, but not to the extent that the cladding glass sidewalls slump. The abutting plates of cladding glass seal to each other and to the waste glass during the annealing cycle when the temperature is at the softening point.

Figure 4:
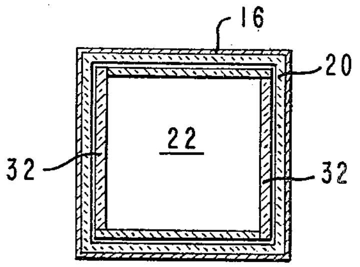
FIG. 4 is a top view in cross section of an alternate means for forming the glass cladding according to this invention.

In the alternative, as shown in FIG. 4, the mold 16 may be square or rectangular or other geometric shape such as hexagonal.

Figure 6A:
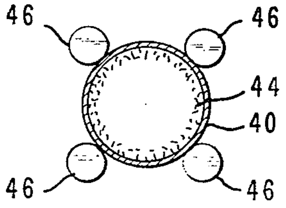
FIG. 6A is a cross-sectional view taken normal to the axis of the device of FIG. 5 before the glass cladding is fused.
Figure 5:
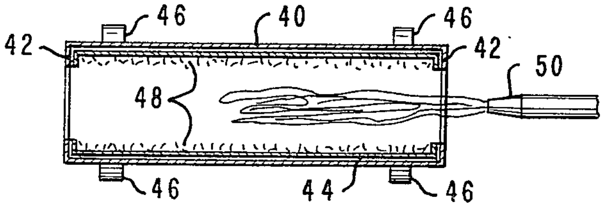
FIG. 5 is a schematic representation and cross-section of yet another embodiment of this invention whereby the cladding is fused in a rotating cylinder.
Figure 6B:
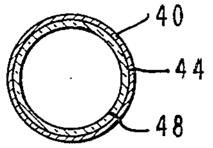
FIG. 6B is a view similar to FIG. 6A after the glass cladding has fused.

With reference to FIGS. 5, 6A and 6B, the process of this invention is also suitable for constructing relatively large containers for the radioactive waste glass. A cylindrical metal container 40 may be disposed horizontally to serve as a mold. Flanges 42 are provided at either end thereof. The interior of container 40 is lined with a parting layer of preferably ceramic fiber paper 44 as in the embodiments of this invention described above. Conventional rollers 46 are provided to rotate cylinder 40 so that when fused particles of glass 48 are injected therein, centrifugal force will cause the fused particles to line the interior thereof.

As in the conventional manufacture of fused quartz pipe the individual particles may be distributed with a tool something like a boring bar used on a lathe so that after the particles 48 are injected into the rotating cylinder 40, a relatively uniform layer of said particles is formed completely covering the ceramic parting layer 44.

A conventional flame of oxy-gas may then be used with a conventional manner nozzle 50 to fuse the glass particles 48. Upon cooling, an inert glass cladding cylinder will be formed within metal mold 40.

After the glass 48 has fused and cooled, a metal bottom plate (not shown) may be bolted to one end to complete the bottom closure and the cylinder 40 assembly including the cylinder of inert glass cladding rotated to a vertical position similar to that of mold 16 in FIG. 1. The bottom of the cladding may be formed by placing a disc of ceramic fiber paper on the bottom plate, followed by a layer of granulated glass dropped onto the paper. In the alternative, a disc of plate glass could be lowered onto the paper.

In the vertical position, the container is then filled with the molten radioactive glass from the furnace by flowing a free fall stream of glass from the orifice of the furnace. When the container mold is filled, a layer of granulated glass or disc of plate glass may be placed on top and fused to the side walls of the cladding glass. A circular radiant electric element (not shown) could be used for this purpose. A metal cover may then be placed over the top and bolted or welded to the cylinder 40 to form a package ready for transportation and/or disposal.

An alternative method of forming the walls of the cladding container in the rotating mold is to moisten the glass particles with an air-setting cement such as sodium silicate solution prior to placing in the mold, followed by air-drying of the cement while the mold is rotating. The particles fuse to a solid layer later during the casting and annealing steps.

The ceramic fiber paper described above in connection with the embodiments of this invention is used to prevent adhesion of the cladding glass to the mold wall. In addition, the ceramic fiber paper retains compressibility during and after filling of the container and therefore can absorb any differential shrinkage of the support mold 40 upon cooling.

In summary then, the process of this invention provides an effective and efficient means for sequestering radioactive waste. In the event water penetrates the metal mold and starts to attack the glass contents, the initial attack will be on inert glass having no radioactive components. Hence, no radioactive elements from the contents can escape to the environment for the duration of time required to disintegrate the cladding. Where the elements in question are Cs-137 and Sr-90, the time for them to decay to background levels is 300 years. The thickness of the cladding which will last this long with a factor of safety of 10 is 3 mm, as established by archeological evidence of glass durability in Aegean Sea water.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for sequestering radioactive waste elements oxides in a leach resistant enclosure for prolonged storage comprising:

incorporating the radioactive elements oxides within the structure of a glass by melting said oxides under a batch blanket with suitable glass forming raw materials or premelted frit to form a substantially homogeneous radioactive molten glass having a selected coefficient of expansion;

providing a support mold having an opening and which is lined with inert leach-resistant cladding glass having a thermal expansion characteristic which is sufficiently close to the expansion characteristic of the said radioactive glass to permit annealing and cooling without cracking or spalling;

heating said mold and said cladding glass to at least the temperature at which said cladding glass does not crack excessively when molten glass contacts it during the casting step;

casting said radioactive glass within said cladding glass held in said mold;

sealing the opening in said cladding glass with inert leach-resistant glass to form a mass of radioactive glass clad substantially in inert leach-resistant glass;

annealing and cooling said mass in such a way as to avoid substantial cracking.

2. The process of claim 1 wherein the seal is formed by a layer of solid glass which is fused to the opening in the cladding glass prior to annealing and cooling.

3. The process of claim 1 wherein the seal is formed by applying a layer of granulated glass which is fused both to itself and to the opening in the cladding glass prior to annealing and cooling.

4. The process of claim 1 wherein the sealing is accomplished after annealing and cooling by application of a plug of room-temperature setting cement having adequate leaching resistance.

5. The process of claim 1 wherein the cladding glass is separated from the mold by a layer of ceramic fiber paper.

6. The process of claim 1 wherein the cladding glass is preformed as a glass container.

7. The process of claim 1 wherein the walls of the cladding glass are composed of sheets of glass which seal together during the casting and annealing steps.

8. The process of claim 1 wherein the walls of the cladding glass are formed of granulated glass which is prefused before the casting and annealing steps.

9. The process of claim 1 wherein the walls of the cladding glass are formed of bonded granulated glass which is fused to itself and to the radioactive glass during the casting and annealing steps.

* * * * *